United States Patent [19]
Woodbury et al.

[11] 3,810,044
[45] May 7, 1974

[54] METHODS FOR PROTECTING LASER OPTICAL ELEMENTS FROM SURFACE DAMAGE

[75] Inventors: Eric J. Woodbury, Tarzana; Donald R. Dewhirst, Torrance, both of Calif.

[73] Assignee: Hughes Aircraft Company, Culver City, Calif.

[22] Filed: Feb. 22, 1973

[21] Appl. No.: 334,550

[52] U.S. Cl............................................. 331/94.5 T
[51] Int. Cl................................................. H01s 3/02
[58] Field of Search ............ 331/94.5; 350/320, 321

[56] References Cited
UNITED STATES PATENTS
3,619,809  11/1971  Ozzimo............................. 331/94.5

*Primary Examiner*—William L. Sikes
*Attorney, Agent, or Firm*—W. H. MacAllister; Paul M. Coble

[57] ABSTRACT

Optical components of a Q-switched laser which are housed within a hermetically sealed chamber and exposed to laser radiation during operation of the laser may be protected from surface damage due to the laser radiation by purging the chamber with a gas containing at least about 50 micrograms of oxygen for each square centimeter of the total surface area exposed to the gas within the chamber prior to operating the laser, and then hermetically sealing the chamber to maintain the aforementioned gas therein at a partial pressure of oxygen not exceeding about one atmosphere during operation of the laser. Protection of optical surfaces within a hermetically sealed laser pumping chamber while cooling the chamber may be achieved by circulating in the laser pumping chamber a pressurized coolant gas consisting of about 99 percent nitrogen and about 1 percent oxygen at a total pressure of about 20 atmospheres.

7 Claims, 1 Drawing Figure

PATENTED MAY 7 1974  3,810,044
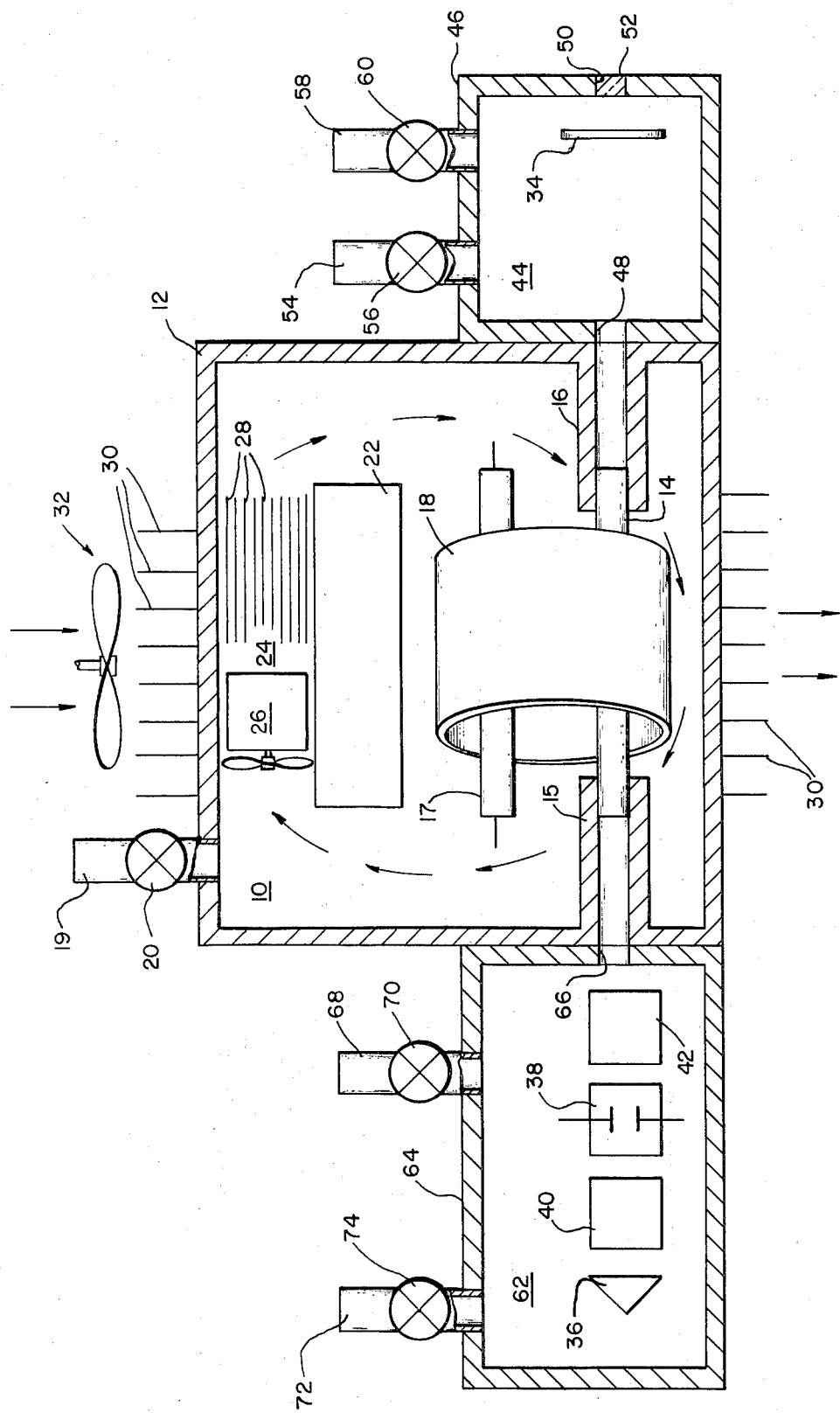

METHODS FOR PROTECTING LASER OPTICAL ELEMENTS FROM SURFACE DAMAGE

This invention relates to lasers, and more particularly relates to methods for reducing damage to the surface of optical components as a result of laser radiation.

The invention herein described was made in the course of or under a contract or subcontract thereunder with the Department of the Air Force.

In many laser systems, and in particular those generating a high peak power output, damage has been found to occur to the surfaces of optical components subjected to the laser radiation. Surface damage to the optical components used to process the generated laser beam results in increased absorption and scattering of the laser beam, thereby decreasing the amount of laser energy transmitted along the desired path or paths. Lower operating efficiency and reduced life of the laser apparatus ensue.

Accordingly, it is an object of the present invention to provide a method for substantially reducing damage to the surfaces of optical elements employed in laser apparatus due to radiation from the laser, thereby enabling increased operating efficiency and longer life of the apparatus to be achieved.

It is a further object of the invention to provide a method for minimizing radiation induced damage to optical components in a laser pumping cavity employing a high pressure coolant gas.

The invention is concerned with laser apparatus wherein at least one optical surface is disposed within a hermetically sealed chamber and exposed to radiation during the operation of the apparatus. In one aspect of the invention, the optical surface is protected by purging the chamber with a gas containing at least about 50 micrograms of oxygen for each square centimeter of the total surface area exposed to the gas within the chamber prior to operating the apparatus and then hermetically sealing the chamber to maintain the aforementioned gas therein during operation of the apparatus.

Another aspect of the invention is concerned with protecting at least one optical element disposed within a hermetically sealed laser pumping chamber while providing for cooling of the chamber. A pressurized coolant gas including about 1 percent oxygen at a partial pressure of oxygen not exceeding about one atmosphere is circulated in the laser pumping chamber.

Additional objects, advantages and characteristic features of the present invention will become apparent from the following detailed description of a preferred embodiment of the invention when considered in conjunction with the accompanying drawing in which the sole FIGURE is a schematic illustration, partly in longitudinal cross-section, of laser apparatus utilizing methods according to the invention.

Referring to the FIGURE with greater particularity, there is shown a laser pumping chamber 10 defined by a housing 12 which is preferably of a metal of good thermal conductivity such as aluminum. Mounted within the lower portion of the chamber 10 is a rod 14 of laser material. The rod 14 may be of Nd:YAG, ruby or other solid state laser material. The laser rod 14 is shown as having its ends supported by respective tubular extensions 15 and 16 projecting into the chamber 10 from opposite side walls of the housing 12. For specific details concerning an exemplary arrangement for mounting the laser rod 14 within extensions 15 and 16 and sealing the rod 14 thereto, reference may be made to U.S. Pat. No. 3,619,809 entitled "Sealing Arrangement for Laser Cooling System" and assigned to the assignee of the present invention. A flash lamp 17 is disposed in lateral proximity to the laser rod 14 to enable pumping of the rod 14 to a lasing state. A tubular shield 18 of a highly reflective material is disposed around the laser rod 14 and the flash lamp 17 so as to concentrate pumping radiation from the lamp 17 onto the laser rod 14.

In order to remove heat generated in the laser rod 14 and flash lamp 17, an arrangement is provided for circulating a high-pressure coolant gas past the laser rod 14 and flash lamp 17. The coolant gas may be admitted to the chamber 10 and vented therefrom via a tube 19 provided with a control valve 20. A partitioning member 22 is disposed within the chamber 10 so as to define a coolant flow path from heat exchange region 24 past the laser rod 14 and flash lamp 17 and back to the heat exchange region 24. The gas may be circulated past the laser rod 14 and flash lamp 17 by means of an impeller-type pump 26. Heat removed from the rod 14 and flash lamp 17 and carried by the coolant to the heat exchange region 24 is transferred to a plurality of heat exchange fins 28 which project inwardly from a wall of housing 12 into the heat exchange region 24. The fins 28 conduct heat through the housing 12 to a plurality of external fins 30 which project outwardly from both the upper and lower walls of the housing 12. The external fins 30 in turn transfer heat by convection to an ambient coolant such as air which is driven past the fins 30 by means of a blower or fan 32.

In order to provide a regenerative optical cavity for the laser as well as an arrangement for controlling the emitted laser energy, desired optical elements are disposed in the path of the emitted laser beam beyond the respective ends of the laser rod 14. Thus, in the exemplary apparatus shown in the FIGURE, a first reflector 34, illustrated as a partially transmissive mirror, is disposed in the path of the laser beam emitted from one end of the rod 14. Disposed in the path of the laser beam emitted from the opposite end of the rod 14 is a second reflector 36, illustrated as a roof prism, which in conjunction with mirror 34 forms a regenerative optical cavity for the laser. Interposed between the reflector 36 and the laser rod 14 are a series of Q-switching elements. For purposes of example, the Q-switching elements may include a lithium niobate Pockels cell 38 disposed between a Rochan polarizer 40 and a Glan-Taylor polarizer 42, although other electro-optic and polarizing elements are also suitable.

Reflector 34 is disposed in a first auxiliary chamber 44 defined by a housing 46 which abuts the housing 12 adjacent tubular extension 16. The wall of housing 46 which abuts housing 12 is provided an aperture 48 which is aligned with the end of the laser rod 14. The opposite wall of housing 46 is provided with an aperture 50 which is aligned with the aperture 48. Aperture 50 contains a window element 52, of glass for example, to provide an exit for the output laser beam. In order to enable the chamber 44 to be purged with the desired atmosphere, housing 46 is provided with a gas intake tube 54 having a control valve 56 and a vent tube 58 having a control valve 60.

The reflector 36 and the Q-switching elements 38, 40 and 42 are disposed in a second auxiliary chamber 62 defined by a housing 64 which abuts the wall of housing 12 opposite to that abutting housing 46. The wall of housing 64 which abuts housing 12 is provided with an aperture 66 which is aligned with the end of laser rod 14. In order to enable the chamber 62 to be purged with the desired atmosphere, housing 64 is provided with a gas intake tube 68 having a control valve 70 and a vent tube 72 having a control valve 74.

In order to reduce damage to the surface of optical components such as reflectors 34 and 36, electro-optic element 38 and polarizing elements 40 and 42, the chambers 44 and 62 are purged and maintained with a gas containing sufficient oxygen to prevent damage to the optical surfaces when subjected to laser radiation from the rod 14. This damage results for example, from decomposition effects of the laser radiation impinging upon contamination layers invariably formed on optical surfaces. In order to neutralize a contamination layer ten molecules thick, about 50 micrograms of oxygen are required for each square centimeter of the total surface area exposed to gas within the chambers 44 and 62 (incuding the inner walls of the chambers 44 and 62 and the outer surfaces of optical components 34, 36, 40 and 42 disposed therein). The partial pressure of oxygen within the chambers 44 and 62 should not exceed about one atmosphere, however, in order to essentially preclude any danger of flammability. A specific exemplary gas which has been employed to purge and fill the chambers 44 and 62 consists of about 80 percent nitrogen and about 20 percent oxygen, with less than about two parts per million of hydrocarbons, less than about 300 parts per million of carbon dioxide, and less than about 5 parts per million of water vapor. Preferably the gas pressure within the chambers 44 and 62 is about one atmosphere.

In purging the chamber 62 with the oxygen-containing gas, the control valves 70 and 74 are opened, and the gas is allowed to circulate through intake tube 68, chamber 62 and vent tube 72 for a duration of about 5 to 10 minutes. The valves 70 and 74 are then closed to hermetically seal the chamber 62 to maintain the oxygen-containing gas within the chamber 62 while keeping out atmospheric contamination such as dust and water vapor. The same procedure may be used to purge chamber 44 with the desired oxygen-containing gas, i.e. the gas is circulated through intake tube 54, chamber 44 and vent tube 58 for about five to 10 minutes, after which the valves 56 and 60 are closed to hermetically seal the chamber 44. The purging of the optical components chambers 44 and 62 can, of course, by carried out simultaneously.

The high pressure coolant gas which is circulated in the laser pumping chamber 10 past the laser rod 14 and the flash lamp 17 includes a sufficient amount of oxygen to prevent damage to the optical surfaces within the chamber 10 when subjected to flash lamp radiation, preferably about 1 percent. Again, for safety purposes, the partial pressure of oxygen within the chamber 10 should not exceed about one atmosphere. A specific exemplary high pressure coolant gas which has been employed consists of about 99 percent nitrogen and about 1% oxygen at a total pressure of about 20 atmospheres.

The maintaining of the aforementioned oxygen-containing gases within the optical element chambers 44 and 62 and in the laser pumping chamber 10 has achieved a substantial reduction in damage to the surfaces of optical components housed in these chambers, resulting in a significant extension in the life of the apparatus. Specifically, a Q-switched Nd:YAG laser constructed substantially as shown in the FIGURE was operated at a level providing laser pulses having a power density of about 10 Megawatts per square centimeter (with a 20 nanosecond pulse width and a pulse repetition rate of 10 pulses per second). When, in accordance with the prior art, the optical element chambers 44 and 62 were purged with dry nitrogen gas at a pressure of about one atmosphere for about 10 minutes prior to operation of the laser and then sealed to maintain this atmosphere in the chambers 44 and 62 during operation of the laser, deterioration in the laser output was observed after about 10 to 20 hours of operation. On the other hand, when the chambers 44 and 62 were purged with the aforementioned specific exemplary gas including about 20 percent oxygen for about 10 minutes prior to operation of the laser and then sealed to maintain this atmosphere in the chambers 44 and 62 during operation of the apparatus, in accordance with the invention, the apparatus was operated for more than 200 hours before the laser output began to deteriorate, an increase in laser life by at least an order of magnitude.

Moreover, when nitrogen gas pressurized to about 20 atmospheres was employed as the coolant gas in the laser pumping chamber 10 of the aforementioned constructed laser, in accordance with the prior art, a deterioration in pumping efficiency was observed after about one hour of laser operation. In contrast, when the aforementioned exemplary coolant gas consisting of a mixture of about 99 percent nitrogen and 1 percent oxygen at a total pressure of about 20 atmospheres was used in the chamber 10, in accordance with the invention, laser operation for over 1,000 hours was achieved without measurable deterioration in pumping efficiency, an improvement by a factor of three orders of magnitude.

Although the present invention has been shown and described with reference to a particular embodiment, nevertheless various changes and modifications obvious to a person skilled in the art to which the invention pertains are deemed to lie within the spirit, scope and contemplation of the invention.

What is claimed is:

1. A method for use with laser apparatus wherein at least one optical surface is disposed within a hermetically sealed chamber and exposed to laser radiation during the operation of said apparatus to protect said surface from damage due to said laser radiation, said method comprising:

purging said chamber with a gas containing at least about 50 micrograms of oxygen for each square centimeter of the total surface area exposed to said gas within said chamber prior to operating said apparatus and hermetically sealing said chamber to maintain said gas therein during operation of said apparatus.

2. A method according to claim 1 wherein the purging operation is continued for a duration of not less than about five minutes.

3. A method according to claim 1 wherein the partial pressure of the oxygen in said gas does not exceed about one atmosphere.

4. A method according to claim 1 wherein said gas consists of about 80 percent nitrogen and about 20 percent oxygen, with less than about two parts per million of hydrocarbons, less than about 300 parts per million of carbon dioxide, and less than about five parts per million of water vapor.

5. A method for use with laser apparatus wherein at least one optical surface is disposed within a hermetically sealed laser pumping chamber and exposed to radiation during the operation of said apparatus to protect said surface from damage due to said radiation while cooling said chamber, said method comprising:

circulating in said chamber a pressurized coolant gas including about 1 percent oxygen at a partial pressure of oxygen not exceeding about one atmosphere.

6. A method according to claim 5 wherein said coolant gas consists of about 99 percent nitrogen and about 1 percent oxygen.

7. A method according to claim 6 wherein the total pressure of said gas is about 20 atmospheres.

* * * * *